April 16, 1963  C. E. BRANICK  3,085,373
METHOD OF WRAPPING PNEUMATIC TIRE CASINGS
Filed Nov. 24, 1961

INVENTOR.
CHARLES E. BRANICK
BY
*Merchant, Merchant & Gould*
ATTORNEYS

3,085,373
METHOD OF WRAPPING PNEUMATIC TIRE CASINGS

Charles E. Branick, % Branick Mfg. Co., Box 1937, Fargo, N. Dak.
Filed Nov. 24, 1961, Ser. No. 154,569
3 Claims. (Cl. 53—13)

My invention relates generally to the art of wrapping of pneumatic tire casings and provides a novel method of wrapping the same in transparent sheet material whereby the entire exterior of the casing, while protected from the elements during storage and shipment, is visible at all times for inspection by handlers and prospective purchasers.

More specifically, my invention provides a novel method of wrapping a tire casing with an elongated strip of transparent thermo-plastic sheet material, originally in flat form; and is related to the inventions disclosed but not claimed in my following pending United States applications: "Method of and Apparatus for Forming Wrappers for Articles of Annular Shape," Serial No. 9,525, filed February 18, 1960; "Tire Bead Spacing and Supporting Element," Serial No. 142,810, filed October 4, 1961; "Wrapper for Pneumatic Tire Casings and Method of Forming Same," Serial No. 154,586, filed November 24, 1961.

An important object of my invention is the provision of a method of wrapping tire casings, which not only actually enhances the appearance thereof, but also which may be practiced with a considerable saving of time, labor and materials.

The above and still further objects of this invention will become apparent from the following detailed specification, appended claims and attached drawings.

Referring to the drawings wherein like reference characters indicate like parts or elements throughout the several views.

Figure 1:
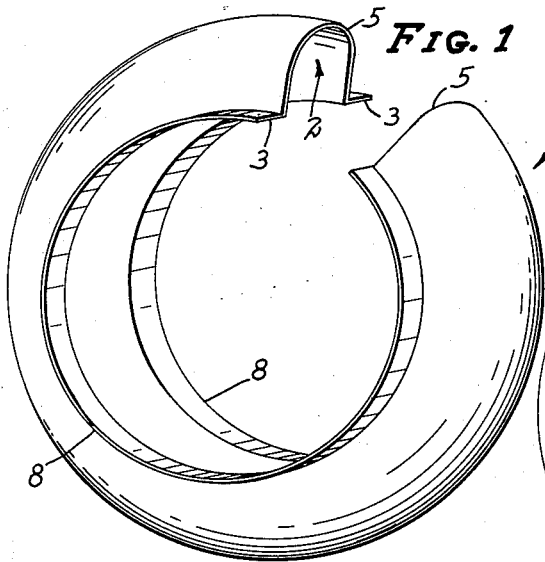
FIG. 1 is a view in perspective of a preformed wrapper utilizable in the practice of my novel method.
Figure 2:
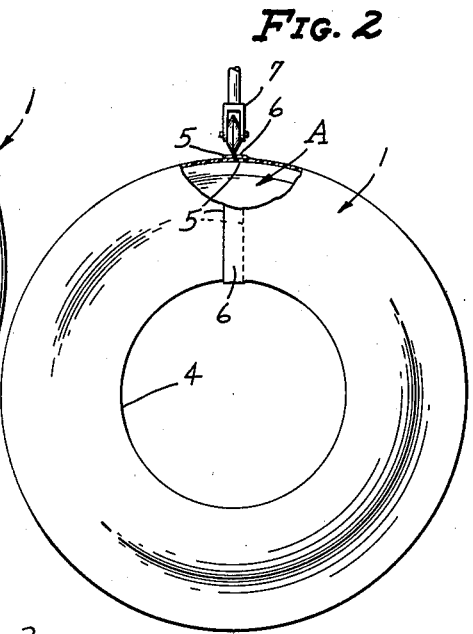
FIG. 2 is a view in side elevation, illustrating one of the steps in the practice of my novel method with the wrapper of FIG. 1, some parts being broken away and some parts shown in section.

Referring more specifically to the drawings, and initially to FIGS. 1–4 inclusive thereof, the numeral 1 indicates a wrapper formed from a strip of transparent thermoplastic sheet material as disclosed in my application "Wrapper for Pneumatic Tire Casings and the Method of Forming Same," filed of even date herewith. As shown, the wrapper 1 is in the nature of a split ring having a generally arcuate cross-sectional contour which defines intermediate its side edges, a radially inwardly opening tire-receiving-channel 2 and generally cylindrical flat forming side portions 3 which project axially outwardly in opposite directions.

For a purpose which will hereinafter become apparent, the radial depth of the channel 2 of each split ring wrapper 1 corresponds approximately to the radial depth of a tire casing A to be wrapped therein. Consequently, the cylindrical flap-forming portions 3 correspond in diameter approximately to the opening 4 defined by the beads $b$ of the tire casing A. Also, the maximum diameter of the wrapper 1, whether preformed or alternatively formed upon the tire casing A, is slightly greater than that of the tire casing A, whereby, when said wrapper 1 is stretched taut circumferentially about the tire A, the opposite ends 5 will overlap as indicated particularly by the numeral 6 in FIG. 2. Preferably, the overlapped ends 5 of the split ring wrapper 1 are secured together, such as by a heated sealing element 7, to maintain the wrapper 1 circumferentially taut during the subsequent steps of my process.

To complete the wrapping of the casing A with the wrapper 1, the cylindrical flap-forming side portions 3 are infolded whereby to cover the radially inner surfaces $c$ of the beads $b$ and cause overlapping relationship of their outer edges 8 centrally of said beads $b$. Sealing of the overlapped edges 8 of the flap-forming portions 3 intermediate said beads $b$ is accomplished by any suitable means such as heated rotary sealing tool 9, as shown particularly in FIG. 3.

Figure 3:
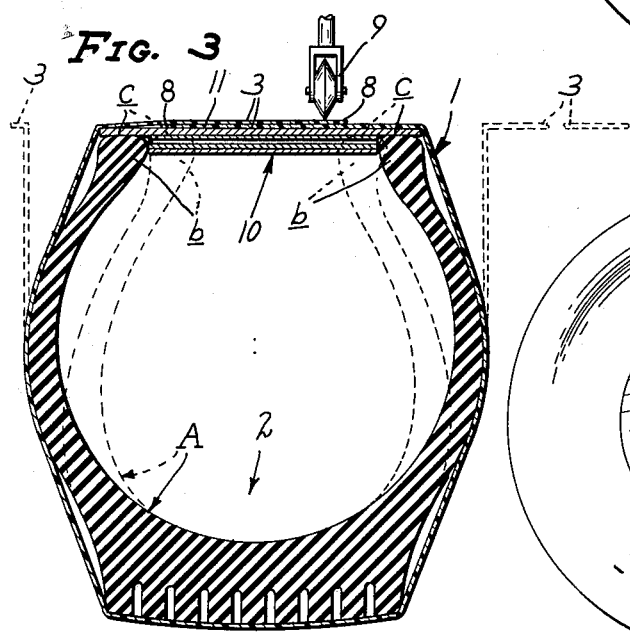
FIG. 3 is an enlarged view in cross section of a tire casing illustrating a further step in my novel method.
Figure 4:
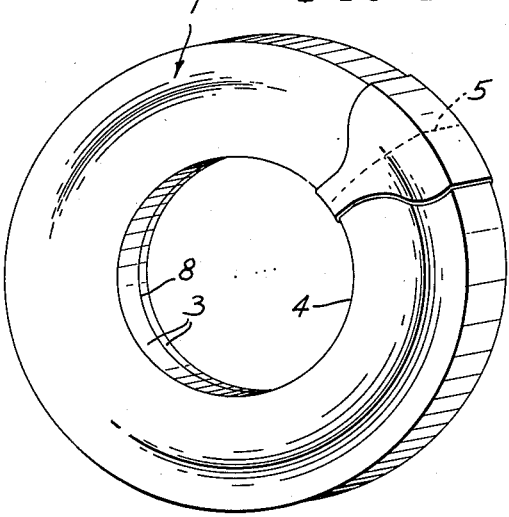
FIG. 4 is a view in perspective showing a tire casing wrapped in accordance with my novel method.

Preferably and as shown in FIG. 3, the beads $b$ of the tire casing A are spread apart slightly and a suitable spacer band 10, such as is disclosed and claimed in my co-pending application "Tire Bead Spacing and Supporting Element," Serial No. 142,810, filed October 4, 1961, is inserted between the beads $b$ to maintain them in spaced condition while wrapped, for purposes of appearances. In this event, the flap-forming portions 3 are caused to overlie the radially inner surface 11 of the spacer 10 and the pressure of the heated tool 9 is brought to bear thereagainst for the purpose of effecting an endless seal intermediate the beads $b$.

Figure 5:
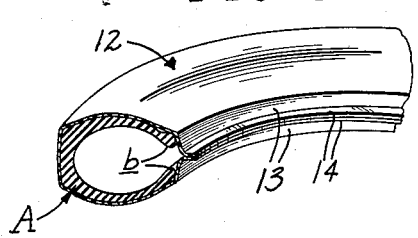
FIG. 5 is a fragmentary view in perspective of a tire casing, some parts being broken away and some parts shown in section, and illustrating a slightly different method of sealing of the wrapper in accordance with my invention.

Referring now to FIG. 5, the wrapper 12 is of the type disclosed and claimed in my co-pending application "Wrapper for Pneumatic Tire Casings and the Method of Forming Same," Serial No. 154,568, filed of even date herewith, the flap-forming circumferentially extended opposite edge portions thereof being identified by the numeral 13. The only difference between the method of wrapping the tire casing A with the wrapper 12, as distinguished from that utilized with the wrapper 1 is that the flap-forming portions 13 instead of being overlapped in overlying relationship to the beads $b$, are merely brought axially inwardly to cause the edge portions 14 of the flaps 13 to engage each other radially inwardly of the beads $b$ and in a plane intermediate said beads $b$. While held in such a position, the flap-forming portions 13 are suitably sealed such as by heat treatment.

Wrappers 1 and 12 may be formed from any suitable transparent thermoplastic, preferably tough, sheet material such as polyethylene; and I wish it to be specifically understood that the above methods may be alternatively practiced by first preforming the wrapper and thereafter placing it about the tire casing; or by forming the wrapper directly upon the tire casing A from a ribbon-like strip of flat sheet material. A great amount of such sheeting may be stored in rolled form and unwound as used, thereby utilizing but a minimum of space for storage. On the other hand, wrappers formed from such sheeting may be quickly removed from a tire casing by the use of a knife or other sharp instruments, and readily disposed of as by burning.

This invention has been thoroughly tested and found to be completely satisfactory for the accomplishments of the above objects; and while I have shown and described a preferred embodiment thereof, I wish it to be specifically understood that the same is capable of modification without departure from the scope and spirit of the appended claims.

What I claim is :
1. The method of wrapping a bead-equipped pneumatic tire casing which comprises

(a) forming a ribbon-like strip of transparent thermoplastic sheet material to provide
(b) a cross-sectionally generally arcuate split ring having a maximum diameter slightly greater than a tire to be wrapped therein
(c) and having a cross-sectional contour which defines a radially inwardly opening tire-receiving channel
(d) having opposite side edge portions capable of being brought into engagement with each other radially inwardly of the beads of said casing,
(e) placing of a cylindrical spacer band between the beads of said casing to maintain same in a spread condition,
(f) in-turning said side edge portions to cause engagement thereof with respect to each other radially inwardly of the beads of said casing,
(g) and finally sealing said engaging edge portions together.

2. The method of wrapping a bead-equipped pneumatic tire casing which comprises
(a) forming a ribbon-like strip of transparent thermoplastic sheet material to provide
(b) a cross-sectionally generally arcuate split ring having a maximum diameter slightly greater than a tire to be wrapped therein
(c) and having a cross-sectional contour which defines a radially inwardly opening tire receiving channel
(d) having opposite side edge portions capable of being brought into engagement with each other radially inwardly of the beads of said casing,
(e) placing of a cylindrical spacer band between the beads of said casing to maintain same in a spread condition,
(f) in-folding of said edge portions to cause overlapping engagement thereof in overlying relationship to the inner peripheral surface of said spacer band,
(g) and finally sealing said overlapped edge portions together against said inner peripheral surface.

3. The method of wrapping a bead-equipped pneumatic tire casing of a given size which comprises
(a) forming a ribbon-like strip of thermoplastic sheet material to provide a cross-sectionally arcuate split ring
(b) having a maximum diameter approximating that of said tire
(c) and having a cross-sectional contour which defines a radially inwardly opening tire-receiving channel having opposite edge portions capable of being joined together radially inwardly of the beads of said tire,
(d) placing said split ring tightly about said casing,
(e) anchoring the opposite end portions of said ring with respect to each other,
(f) in-turning said edge portions to cause engagement thereof with each other radially inwardly of the beads of said casing and in a plane intermediate said beads, and
(g) sealing said edge portions together in said plane.

References Cited in the file of this patent
UNITED STATES PATENTS
1,165,644   Wood _____ Dec. 28, 1915
3,005,542   Harrison _____ Oct. 24, 1961